(12) United States Patent
Zuest et al.

(10) Patent No.: US 12,475,440 B2
(45) Date of Patent: Nov. 18, 2025

(54) METHOD AND SYSTEM FOR EFFICIENT RECYCLING OF RESIDUAL MATERIAL

(71) Applicants: TRUMPF SCHWEIZ AG, Gruesch (CH); ZUEST ENGINEERING AG, Seegraeben (CH)

(72) Inventors: Rainer Zuest, Seegraeben (CH); Tobias Meck, Igis (CH)

(73) Assignees: TRUMPF SCHWEIZ AG, Gruesch (CH); ZUEST ENGINEERING AG, Seegraeben (CH)

( * ) Notice: Subject to any disclaimer, the term of this patent is extended or adjusted under 35 U.S.C. 154(b) by 287 days.

(21) Appl. No.: 18/337,058

(22) Filed: Jun. 19, 2023

(65) Prior Publication Data

US 2023/0334440 A1    Oct. 19, 2023

Related U.S. Application Data

(63) Continuation of application No. PCT/EP2022/051875, filed on Jan. 27, 2022.

(30) Foreign Application Priority Data

Jan. 29, 2021    (DE) .................. 10 2021 200 831.3

(51) Int. Cl.
  *G06Q 10/30*    (2023.01)
(52) U.S. Cl.
  CPC .................... *G06Q 10/30* (2013.01)
(58) Field of Classification Search
  CPC .............. G06Q 10/30; B09B 3/00; B09B 5/00
  See application file for complete search history.

(56) References Cited

U.S. PATENT DOCUMENTS 5,033,374 A * 7/1991 Vezzani .................. B30B 9/326
                                                     100/95
6,305,548 B1    10/2001 Sato et al.
(Continued)

FOREIGN PATENT DOCUMENTS

| CN | 1649679 A | 8/2005 |
|----|-----------|--------|
| DE | 19944688 A1 | 4/2000 |

(Continued)

OTHER PUBLICATIONS

Lee, C. H., Chang, C. T., Fan, K. S., & Chang, T. C. (2004). An overview of recycling and treatment of scrap computers. Journal of hazardous materials, 114(1-3), 93-100. (Year: 2004).*

(Continued)

*Primary Examiner* — John S. Wasaff
(74) *Attorney, Agent, or Firm* — LEYDIG, VOIT & MAYER, LTD.

(57) ABSTRACT

A method recycles residual material from processing a workpiece. The method includes the following steps: A) transmitting information about a desired material family of the residual material, tolerated accompanying materials in the residual material, and/or desired residual material part size, from a recycler computer to a workpiece processor computer; and B) workpiece processing with a processing machine while generating residual material. The method steps A) and B) can be carried out in any order or simultaneously and the following method step is carried out after the method step B): (D) collecting the residual material in a container with a logistics facility in accordance with the information transmitted.

12 Claims, 1 Drawing Sheet

(56) References Cited

U.S. PATENT DOCUMENTS

| | | | |
|---|---|---|---|
| 11,897,690 B1* | 2/2024 | Megyese | G06Q 10/30 |
| 2002/0049565 A1 | 4/2002 | Kirila et al. | |
| 2003/0014334 A1* | 1/2003 | Tsukamoto | G06Q 10/087 |
| | | | 705/28 |
| 2004/0039587 A1 | 2/2004 | Horoshige et al. | |
| 2004/0215496 A1 | 10/2004 | Tsuchida et al. | |
| 2004/0250396 A1* | 12/2004 | Morii | B03B 9/061 |
| | | | 29/403.1 |
| 2005/0166380 A1 | 8/2005 | Ishida et al. | |
| 2009/0201369 A1 | 8/2009 | Jones et al. | |
| 2011/0238598 A1* | 9/2011 | Borowski | B65F 1/0066 |
| | | | 705/500 |
| 2012/0323766 A1 | 12/2012 | Galindo et al. | |
| 2013/0166249 A1* | 6/2013 | Jones | G01G 9/00 |
| | | | 702/173 |
| 2014/0374390 A1* | 12/2014 | Beransky | B23K 26/38 |
| | | | 219/121.7 |
| 2015/0306653 A1* | 10/2015 | Mathias | B21D 28/10 |
| | | | 700/219 |
| 2019/0279168 A1* | 9/2019 | Lardner | G01G 19/414 |
| 2019/0291139 A1* | 9/2019 | Centers | B07B 9/02 |
| 2022/0358267 A1 | 11/2022 | Schuh | |

FOREIGN PATENT DOCUMENTS

| | | |
|---|---|---|
| DE | 102019209772 A1 | 1/2021 |
| JP | H05247543 A | 9/1993 |
| JP | 2003016179 A | 1/2003 |
| JP | 2003233666 A | 8/2003 |
| JP | 2006277449 A | 10/2006 |
| JP | 2008242920 A | 10/2008 |
| JP | 2013189271 A | 9/2013 |
| WO | WO 03064291 A2 | 8/2003 |
| WO | WO 2008089443 A2 | 7/2008 |
| WO | WO 2010009448 A1 | 1/2010 |
| WO | WO 2014009735 A2 | 1/2014 |
| WO | WO 2014079586 A1 | 5/2014 |
| WO | WO 2018099549 A1 | 6/2018 |

OTHER PUBLICATIONS

Seyssaud, J., Moitrier, C., Girones, P., Ducros, C., Favrichon, J., & Soulabaille, Y. (2015). Robotic D&D: Smart Robots. In Waste Management 2015 Conference. (Year: 2015).*

* cited by examiner

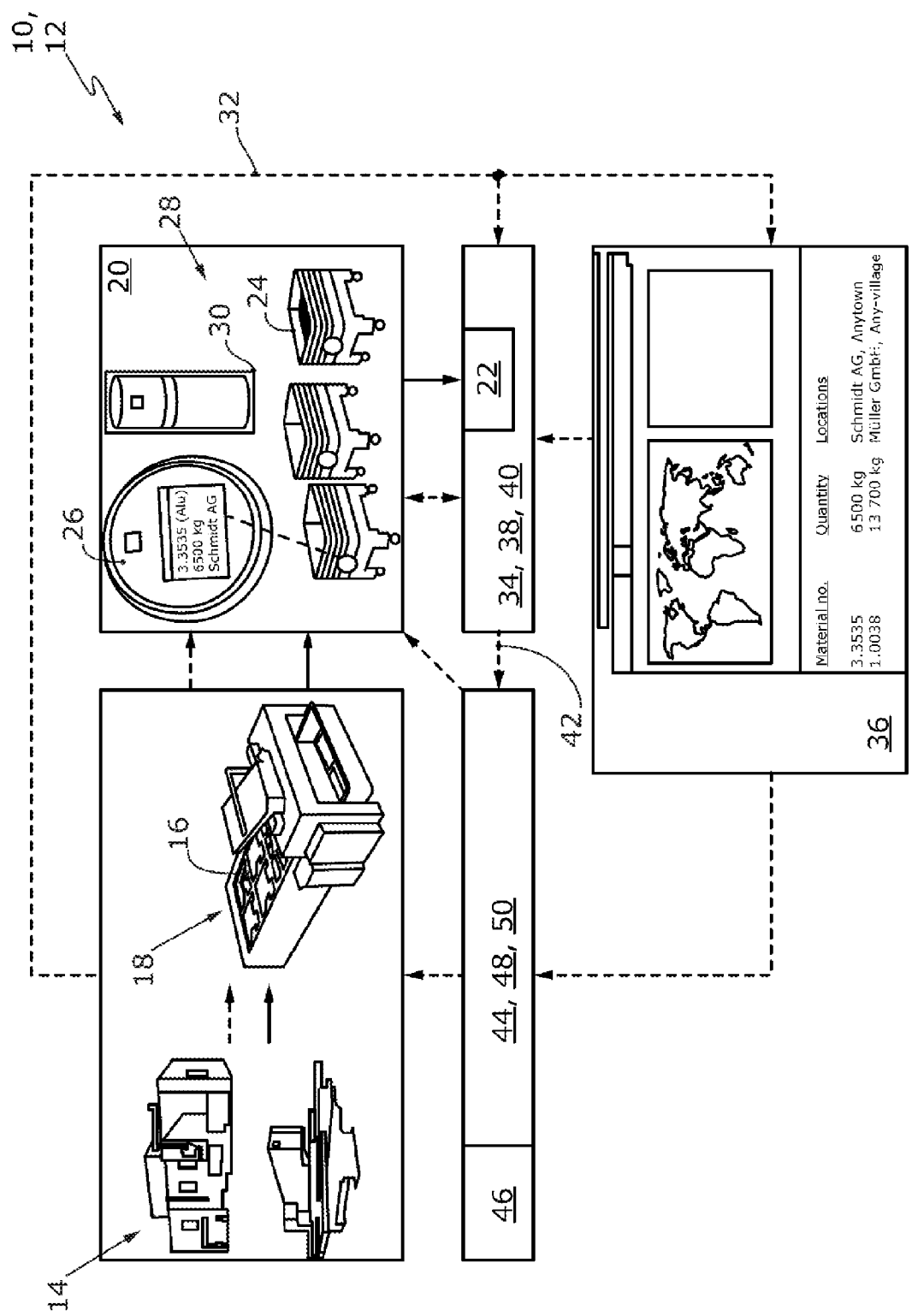

METHOD AND SYSTEM FOR EFFICIENT RECYCLING OF RESIDUAL MATERIAL

CROSS REFERENCE TO RELATED APPLICATIONS

This application is a continuation of International Application No. PCT/EP2022/051875 (WO 2022/162054 A1), filed on Jan. 27, 2022, and claims benefit to German Patent Application No. DE 10 2021 200 831.3, filed on Jan. 29, 2021. The aforementioned applications are hereby incorporated by reference herein.

FIELD

The present disclosure relates to a method and to a system for recycling residual material from the processing of a workpiece.

BACKGROUND

Waste or residual material generated during workpiece processing is typically collected and—still mixed with other residual materials—transferred to a recycler. However, the fact that the residual materials are mixed together makes recycling of the residual material more difficult. This is because the recycler generally has no reliable information about the material (metallurgical) composition of the residual material.

SUMMARY

In an embodiment, the present disclosure provides a method that recycles residual material from processing a workpiece. The method comprising the following steps: A) transmitting information about a desired material family of the residual material, tolerated accompanying materials in the residual material, and/or desired residual material part size, from a recycler computer to a workpiece processor computer; and B) workpiece processing with a processing machine while generating residual material. The method steps A) and B) can be carried out in any order or simultaneously and the following method step is carried out after the method step B): (D) collecting the residual material in a container with a logistics facility in accordance with the information transmitted.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 schematically shows a system according to the invention and a method according to the invention.

DETAILED DESCRIPTION

Aspects of the present disclosure provide a method and a system for significantly more efficient recycling of residual material.

An aspect of the present disclosure provides a recycling method, in which information regarding the desired material family of the residual material, regarding the tolerable accompanying materials (impurities) in the residual material and/or regarding the size of the individual parts of the residual material is transmitted from the recycler of the residual material to a workpiece processor. The material family is to be understood in particular as a combination of a plurality of standardized material numbers in one container. Alternatively or in addition, information regarding desired quality and complaint criteria can be transmitted from the recycler to the workpiece processor.

The information is transmitted from a recycler computer to a workpiece processor computer. The residual material is a byproduct generated by the workpiece processor when a workpiece is processed with a processing machine. The residual material is then collected in a container in accordance with the information previously obtained and, in particular, transported to the recycler.

Within the scope of the present disclosure, very specific specifications for the desired residual material are thus transmitted to the workpiece processor by the recycler ("voice of customer"). Because the recycler does not then need to recycle any arbitrary type of residual material and possibly reprocess it, the recycling can be carried out particularly efficiently. This also enables the workpiece operator to achieve higher prices for the residual material, so that both ecological and economic benefits are achieved.

Within the scope of the present disclosure, the information may be transmitted via a data connection, in which the connected partners are each connected to the Internet and/or an Intranet via a network connection. The recycler may be in the form of a scrap dealer, a smelting plant, a steel mill and/or a foundry. The workpiece processor computer and/or the recycler computer can be at least partially cloud-based.

The workpiece processor computer is preferably part of a production planning and control system (PPS). The PPS can have an Enterprise Resource Planning system (ERP) and/or a Manufacturing Execution System (MES). The workpiece processor computer can have a workpiece processor algorithm, in particular with an artificial intelligence system. The artificial intelligence system can have a trained neural network. Alternatively, or in addition, the workpiece processor computer may have a display device on which the material information desired by the recycler is displayed at the workpiece processor.

Preferably, information about the residual material actually generated is transmitted to the recycling computer after workpiece processing. The information about the actual residual material generated preferably includes information about the material family of the residual material, about the accompanying material of the residual material, about the fill level of the container and/or the size of the residual material parts. The fill level of the container can be ascertained with a weighing scale.

The recycler computer can use a recycler algorithm, which uses the information about the residual material actually generated to ascertain which additional residual material is to be requested. The additional residual material can be requested in a subsequent method step by transmitting information to the workpiece processor. This completes the information circuit between the workpiece processor and the recycler.

The recycler algorithm can contain an artificial intelligence (AI) system. The artificial intelligence system can have a trained neural network.

In a particularly preferred embodiment of the present disclosure, the residual material is crushed by a crusher before being collected. If the residual material part size is reduced, the residual material can be more easily stored, transported and processed at the recycler.

The information regarding the actual residual material generated can be stored on a tracker of a track and trace system. The tracker may be arranged on or formed on the container. A tracker of a track and trace system is in this case understood to mean a tag that is able to be detected by a positioning system, in particular a GPS and/or an indoor positioning system. The tracker may be located using one or more scanners on which the tracker may be logged in. The tracker may preferably be located using anchors by performing a time-of-flight measurement of signals between the tracker and the anchors and then determining the position of the tracker by way of triangulation. The track and trace system is designed to trace the position of the tracker and thus implicitly the position of the residual material in the container.

The information regarding the actual residual material generated can be stored on the tracker by the crusher.

The information transmitted to the workpiece processor can contain information on the price of the residual material, so that a workpiece processor algorithm stored in the workpiece processor computer ascertains which crushing of the residual material is profitable during workpiece processing during the machine main time. The workpiece processor algorithm preferably checks whether crushing is profitable at all and, if so, for which residual material part size.

Alternatively, or in addition, the workpiece processor algorithm stored in the workpiece processor computer can use the information provided on the price of the residual material to ascertain which crushing of the residual material with the crusher, i.e. parallel to the machine main time, is profitable. The workpiece processor algorithm preferably checks whether crushing is profitable and, if so, for which residual material part size. The profitability is associated with a technical optimization, since the appropriate crushing is much less time-consuming for the workpiece processor than for the recycler. This is because the residual material is usually already in a machinable form at the workpiece processor, for example in the form of a flat metal sheet in a machine tool, whereas the residual material at the recycler is often in different shapes and sizes or bent and additional treatment steps, e.g. sorting and crushing, are necessary.

The residual material can be in the form of a skeleton resulting from a sheet metal processing operation. The method according to an aspect of the present disclosure can be used here in a particularly practical way, since residual material generated during sheet metal processing is of the highest quality ("new scrap") and hence particularly attractive for recyclers.

In this case, the crushing is preferably carried out by a crusher in the form of skeleton clippers.

The workpiece processing can involve separating sheet metal parts from a sheet metal panel. This results in residual material in the form of a skeleton. The separation can be carried out with a processing machine in the form of a machine tool. The machine tool is preferably designed in the form of a punching machine and/or a laser cutting machine.

The information stored on the tracker can be transferred in advance from the machine tool to the skeleton clippers. As an alternative or in addition thereto, the information stored on the tracker may be applied to the skeleton in the form of a code and be read by a camera of the skeleton clippers.

A further aspect of the present disclosure provides a system for recycling residual material, in particular by a system for carrying out a method described here. The system has a connection from a recycler computer to a workpiece processor computer. The system also has a processing machine for workpiece processing while generating residual material. The system comprises a logistics facility that can collect the residual material in a container on the basis of information transmitted to the workpiece processor computer and, in particular, transport it to the recycler.

The processing machine is preferably designed in the form of a machine tool for sheet metal processing, wherein the residual material is present in particular in the form of a skeleton.

The container can be fed by a crusher belonging to the system. The crusher is preferably designed in the form of a skeleton clippers.

The workpiece processor computer can have a workpiece processor algorithm, which uses the information transmitted to ascertain the profitability of crushing the residual material with the processing machine during the machine main time.

The workpiece processor computer can alternatively or additionally have a workpiece processor algorithm, which is designed to determine the profitability of crushing the residual material with the crusher on the basis of the information transmitted to the workpiece processor computer. As previously stated, high profitability is also normally accompanied by technical optimization.

The system may have a scales for ascertaining the fill level of the container, wherein the fill level is able to be stored on the tracker. The filling weight is also used to verify that the container has not been changed upon arrival at the recipient (no subsequent admixtures).

The system may have a cloud-based server to which the information about the residual material is able to be transmitted. To this end, the cloud-based server may be connected to the crusher, to the processing machine and/or to the tracker in a wireless and/or wired manner.

The system may furthermore have an online marketplace in which the information about the residual material is able to be displayed.

Further advantages of the present disclosure are evident from the description and the drawing. Similarly, according to the present disclosure, the features mentioned above and those yet to be explained further can be used in each case individually or together in any desired combinations. The embodiments shown and described should not be understood as an exhaustive list, but rather are of an exemplary character for outlining the aspects of the present disclosure.

FIG. 1 shows a system 10 for performing a method 12. In FIG. 1, material streams are shown with solid arrows and information streams with dashed arrows.

A processing machine 14, shown here in the form of a machine tool, in particular a laser cutting machine or a punching machine, carries out a workpiece processing for producing product parts. In addition to the product parts, residual material 16 is produced, here in the form of a skeleton. In the present case, the residual material 16 is crushed in a crusher 18 so that it is better stored and able to be transported and/or recycled.

The residual material 16 is transported to a recycler 22 via a logistics facility 20. The logistics facility 20 has at least one container 24 for transporting the residual material 16.

The transport of the container 24 can be tracked by a tracker 26. The tracker 26 is part of a track and trace system 28. The track and trace system 26 may in this case comprise at least one scanner 30 and/or be part of an indoor localization system. The indoor localization system may in this case have multiple anchors in order to determine the position of the tracker 24. The tracker 26 may also be referred to as a tag of the indoor localization system.

The tracker 26 is able to obtain information 32 about the actual residual material 16 generated from the crusher 18 in a wireless and/or wired manner. The crusher 18 is in turn able to obtain the information 32 about the actual residual material 16 generated from the processing machine 14 in a wireless and/or wired manner. In particular, the information 32 on the actual residual material 16 generated can be stored in a material table of the processing machine 14.

The information 32 on the actual residual material 16 generated can be transmitted from the processing machine 14 and/or the crusher 18 to a recycler computer 34 and/or to an online marketplace 36.

The recycler computer 34 can have a recycler algorithm 38, in particular with an artificial intelligence system 40. The recycler computer 34 can be designed to receive information from the online marketplace 36. The recycler algorithm 38 is designed to ascertain the remaining required material 16 on the basis of the available information and to try to obtain this remaining material 16 for the recycler 22 by means of attractive pricing. In addition, the recycler can redefine the material families (in particular, summarized standardized material numbers in a container) at any time based on current demand. Or the recycler defines it based on exclusion criteria, e.g. the maximum permissible manganese content.

For this purpose, the recycler computer 34 can transmit information 42 about the desired material, i.e. about the desired material family of the residual material 16, acceptable accompanying materials in the residual material 16, and/or desired residual material part size, to a workpiece processor computer 44.

The workpiece processor computer 44 can comprise a display device 46. Alternatively or in addition, the workpiece processor computer 44 can be part of a production planning and control system (PPS), an enterprise resource planning system (ERP), and/or a manufacturing execution system (MES). The workpiece processor computer 44 is preferably designed to control the logistics facility 20 in such a way that residual material 16 is collected according to the information 42 and in particular supplied to the recycler 22. Alternatively or in addition, the workpiece processor computer 44 may be designed to control the processing machine 14 and/or the crusher 18. For this purpose the workpiece processor computer 44 can have a workpiece processor algorithm 48, in particular with an artificial intelligence system 50. The artificial intelligence system 50 can have a trained neural network.

Taking into account the drawing, the present disclosure relates to a highly efficient method 12 and system 10 for recycling residual material 16, in which a recycler 22 communicates the desired material of the residual material 16 to a workpiece processor, in particular a workpiece processor computer 44. In addition, information 32 on the actual residual material 16 generated by the workpiece processor can be communicated to the recycler 22, in particular to a recycler computer 34. This can significantly improve the circular economy. "Compared to a cooking recipe", the recycler 22 (the smelting plant/foundry/steelworks) knows in particular the composition with which the blast furnace is fed much more precisely, due to the information provided by the workpiece processor. This means less energy is expended to bring the melt to the desired specification. The environment benefits from a reduced $CO_2$ emission. At the same time, the processing time is reduced. These are the factors that justify, in particular, higher scrap revenues.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

10 System
12 Method
14 Processing machine
16 Residual material
18 Crusher
20 Logistics facility
22 Recycler
24 Container
26 Tracker
28 Track and trace system
30 Scanner
32 Information about the actual residual material generated
34 Recycler computer
36 Online marketplace
38 Recycler algorithm
40 Artificial intelligence system
42 Information about the desired material
44 Workpiece processor computer
46 Display device
48 Workpiece processor algorithm
50 Artificial intelligence system

The invention claimed is:

1. A method for recycling residual material from processing a workpiece, the method comprising:
   A) receiving, by a workpiece processor computer from a recycler computer, information about a desired material family of the residual material, tolerated accompanying materials in the residual material, and desired residual material part size;
   B) workpiece processing using a processing machine while generating actual residual material, wherein workpiece processing comprises:

separating sheet metal parts from a sheet metal panel with the processing machine while generating a skeleton;

transferring information related to the sheet metal panel stored on the processing machine to a machine tool; and processing the skeleton using the machine tool to generate the actual residual material;

wherein the method steps A) and B) can be carried out in any order or simultaneously and the following method step is carried out after the method step B);

D) sending the actual residual material to a logistics facility to be collected in a container, wherein information related to the actual residual material generated is stored on a tracker disposed on the container;

E) transmitting, by the workpiece processor computer, information about the actual residual material to the recycler computer; and F) receiving, by the workpiece processor computer, redefined information about the desired material family of the residual material, tolerated accompanying materials in the residual material, and/or desired residual material part size, based on the information about the actual residual material generated.

2. The method as claimed in claim 1, wherein the processor computer has a recycler algorithm, which determines optimized information transmitted in a subsequent method step A).

3. The method as claimed in claim 1, wherein the following method step is carried out after method step B) and before method step D):

C) crushing the residual material with a crusher.

4. The method as claimed in claim 1, wherein the tracker is part of a track and trace system of the logistics facility.

5. The method as claimed in claim 4, wherein the information on the actual residual material generated is stored on the tracker by a crusher.

6. The method as claimed in claim 1, wherein the transmitted information comprises information on a price of the residual material and a workpiece processor algorithm stored in the workpiece processor computer determines which crushing of the residual material is profitable during workpiece processing during a machine main time.

7. The method as claimed in claim 1, wherein the transmitted information contains information on a price of the residual material and a workpiece processor algorithm stored in the workpiece processor computer determines which crushing of the residual material with a crusher is profitable.

8. The method as claimed in claim 1, wherein the residual material in the form of the skeleton is crushed by a crusher in the form of skeleton clippers.

9. The method as claimed in claim 8, wherein the information stored on the tracker was previously transferred from the machine tool to the skeleton clippers, and/or wherein the information stored on the tracker is applied to the skeleton in the form of a code and is read out by a camera of the skeleton clippers.

10. A system for recycling residual material from processing a workpiece, for carrying out the method as claimed in claim 1, in which the system comprises the following features:

a) a wireless and/or wired connection of a recycler computer to a workpiece processor computer;

b) a processing machine for workpiece processing while generating residual material; and d) a logistics facility which is designed to collect the residual material in a container of the system while evaluating the information transmitted to the workpiece processor computer.

11. The system as claimed in claim 10, wherein the system comprises the following:

c) a crusher for feeding the container.

12. The system as claimed in claim 10, wherein the workpiece processor computer has a workpiece processor algorithm, which is designed to determine a profitability of crushing the residual material with the processing machine based on the information transmitted to the workpiece processor computer.

* * * * *